(12) United States Patent
Green et al.

(10) Patent No.: US 12,712,138 B2
(45) Date of Patent: Aug. 18, 2026

(54) DEVICE FOR REMOTELY ZEROIZING AN ADVANCED GROUND-AIR RADIO

(71) Applicant: Ultralife Corporation, Newark, NY (US)

(72) Inventors: Christopher Green, Newark, NY (US); David Kucy, Charlotte, NC (US)

(73) Assignee: Ultralife Corporation, Newark, NY (US)

( * ) Notice: Subject to any disclaimer, the term of this patent is extended or adjusted under 35 U.S.C. 154(b) by 327 days.

(21) Appl. No.: 18/604,599

(22) Filed: Mar. 14, 2024

(65) Prior Publication Data

US 2024/0321532 A1 Sep. 26, 2024

Related U.S. Application Data

(60) Provisional application No. 63/453,591, filed on Mar. 21, 2023, provisional application No. 63/542,574, filed on Oct. 5, 2023.

(51) Int. Cl.

| | |
|---|---|
| ***H01H 13/14*** | (2006.01) |
| ***G06F 21/78*** | (2013.01) |
| ***H01H 9/04*** | (2006.01) |
| ***H05K 1/181*** | (2026.01) |

(52) U.S. Cl.
CPC ............. *H01H 13/14* (2013.01); *G06F 21/78* (2013.01); *H01H 9/04* (2013.01); *H05K 1/181* (2013.01); *H05K 2201/10053* (2013.01)

(58) Field of Classification Search
CPC ..................... H05K 1/18; H05K 1/181; H05K 2201/10053; G06F 21/78; G06F 13/00; G06F 13/36; G06F 13/38; H01H 13/14; H01H 9/04; H04M 11/06; H04M 11/066
USPC ........................................................ 200/11 R
See application file for complete search history.

(56) References Cited

U.S. PATENT DOCUMENTS

| | | | |
|---|---|---|---|
| 4,688,262 A | 8/1987 | Schaefer et al. | |
| 7,223,926 B1 | 5/2007 | Gannon et al. | |
| 11,616,524 B2 * | 3/2023 | Greco ................. | H04B 1/3888 455/90.1 |
| 2008/0291016 A1 | 11/2008 | Sharp | |
| 2009/0060194 A1 | 3/2009 | Mackey et al. | |
| 2010/0155201 A1 | 6/2010 | Zuluaga et al. | |
| 2014/0064489 A1 | 3/2014 | Flisnes | |
| 2017/0271104 A1 | 9/2017 | Wilkins et al. | |

OTHER PUBLICATIONS

International Search Report With Written Opinion for PCT/US2024/019829 Jun. 18, 2024.
International Preliminary Report on Patentability for PCT/US2024/019829 (Oct. 6, 2025) Oct. 6, 2025.

* cited by examiner

*Primary Examiner* — Anthony R Jimenez
(74) *Attorney, Agent, or Firm* — Michael J. Nickerson

(57) ABSTRACT

A hold-up battery switch includes an exterior cap having an opening and a zeroize circuit board. The zeroize circuit board includes a zeroize contact. The d zeroize contact being located within the opening of the exterior cap. The exterior cap has an exterior cap exterior interface. The exterior cap exterior interface is configured to engage a negative terminal of a hold-up battery.

20 Claims, 6 Drawing Sheets

DEVICE FOR REMOTELY ZEROIZING AN ADVANCED GROUND-AIR RADIO

PRIORITY INFORMATION

The present application claims priority, under 35 U.S.C. § 119(e), from U.S. Provisional Patent Application, Ser. No. 63/453,591, filed on Mar. 21, 2023. The entire content of U.S. Provisional Patent Application, Ser. No. 63/453,591, filed on Mar. 21, 2023, is hereby incorporated by reference.

The present application claims priority, under 35 U.S.C. § 119(e), from U.S. Provisional Patent Application, Ser. No. 63/542,574, filed on Oct. 5, 2023. The entire content of U.S. Provisional Patent Application, Ser. No. 63/542,574, filed on Oct. 5, 2023, is hereby incorporated by reference.

BACKGROUND

Conventional military vehicles; such as personnel carriers, supply trucks, mobile artillery vehicles, and helicopters; carry advanced ground-air networking radios (AGNRs). These radios provide secure communications between friendlies in a theater of operations.

However, there are times when such military vehicles become disabled during operations and the military vehicles may be able to be retrieved or destroyed before falling into the wrong hands. If such vehicles fall into the wrong hands, future operations may become compromised from the intelligence gathered the disabled vehicle.

With respect to an advanced ground-air networking radio, these radios include highly classified software that provides the secure communications between friendlies in a theater of operations. If such software were to fall into the wrong hands, secure communications between friendlies in a theater of operations could be compromised leading to unsuccessful operations and/or unnecessary causalities.

To prevent such a compromising situation, the advanced ground-air networking radio needs to be zeroized such that the highly classified software, which provides the secure communications between friendlies in a theater of operations, in the advanced ground-air networking radio is zeroized or wiped clean.

Conventionally, the zeroizing of the advanced ground-air networking radio has to be triggered manually by an operator who has the advanced ground-air networking radio in hand. More specifically, the operator has to manually activate a switch on the advanced ground-air networking radio. This process is suitable, if the radio is accessible by the operator but in instances where the radio is installed in an avionics bay in an aircraft and not accessible to the operator, for example, there must be a method to remotely zeroize the radio from the cockpit. This scenario would likely occur if the aircraft were damage and forced down and the operator could zeroize the radio prior landing or sometime thereafter, preventing an enemy combatant from gaining unauthorized access to an operation radio.

FIG. 1 shows a conventional situation wherein an advanced ground-air networking radio 30 is installed on a military vehicle 10. As illustrated in FIG. 1, a military vehicle 10 provides power 15 to an advanced ground-air networking radio power adapter 20, which includes a radio output switch 25 that provides power 35 to the advanced ground-air networking radio 30. The advanced ground-air networking radio 30 includes a hold-up battery (HUB) (not shown). The hold-up battery maintains the programmed information (such as the highly classified software that provides the secure communications between friendlies in a theater of operations) in the advanced ground-air networking radio 30.

To zeroize the advanced ground-air networking radio 30, the operator would manually initiate or trigger the zeroizing process of the advanced ground-air networking radio 30 by manually activating the radio zeroize function on the radio or removing the hold-up battery from the advanced ground-air networking radio.

As noted above, the conventional procedure for zeroizing the advanced ground-air networking radio 30 requires the physical presence of an operator to manually activate the zeroize function on the radio or manually removal of the hold-up battery from the advanced ground-air networking radio.

Therefore, it is desirable to provide a process for triggering the zeroizing of the advanced ground-air networking radio which does not require a surviving operator to have the advanced ground-air networking radio in hand.

Also, it is desirable to provide a device for triggering the zeroizing of the advanced ground-air networking radio which does not require a surviving operator to manually remove the hold-up battery from the advanced ground-air networking radio.

Moreover, it is desirable to provide a device that can remotely trigger the zeroizing of the advanced ground-air networking radio.

Additionally, it is desirable to provide a device that can remotely trigger the zeroizing of the advanced ground-air networking radio which does not require any changes to the specifications of the advanced ground-air networking radio.

Furthermore, it is desirable to provide a device that can remotely trigger the zeroizing of the advanced ground-air networking radio which does not require any changes to the interface between the advanced ground-air networking radio and the advanced ground-air networking radio power adapter.

Lastly, it is desirable to provide a device that can remotely trigger the zeroizing of the advanced ground-air networking radio which can be merely inserted into the existing circuitry supporting the advanced ground-air networking radio.

BRIEF DESCRIPTION OF THE DRAWINGS

The drawings are only for purposes of illustrating various embodiments and are not to be construed as limiting, wherein.

DETAILED DESCRIPTION OF THE DRAWINGS

Figure 1:
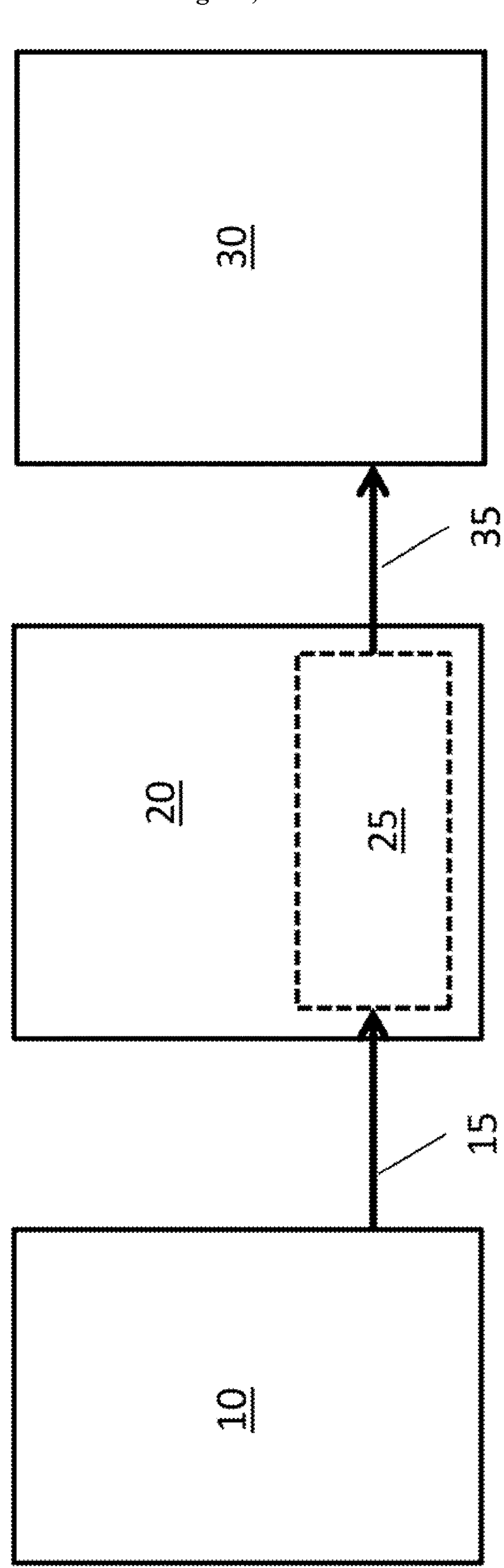
FIG. 1 illustrates a conventional arrangement for an advanced ground-air networking radio.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 2:
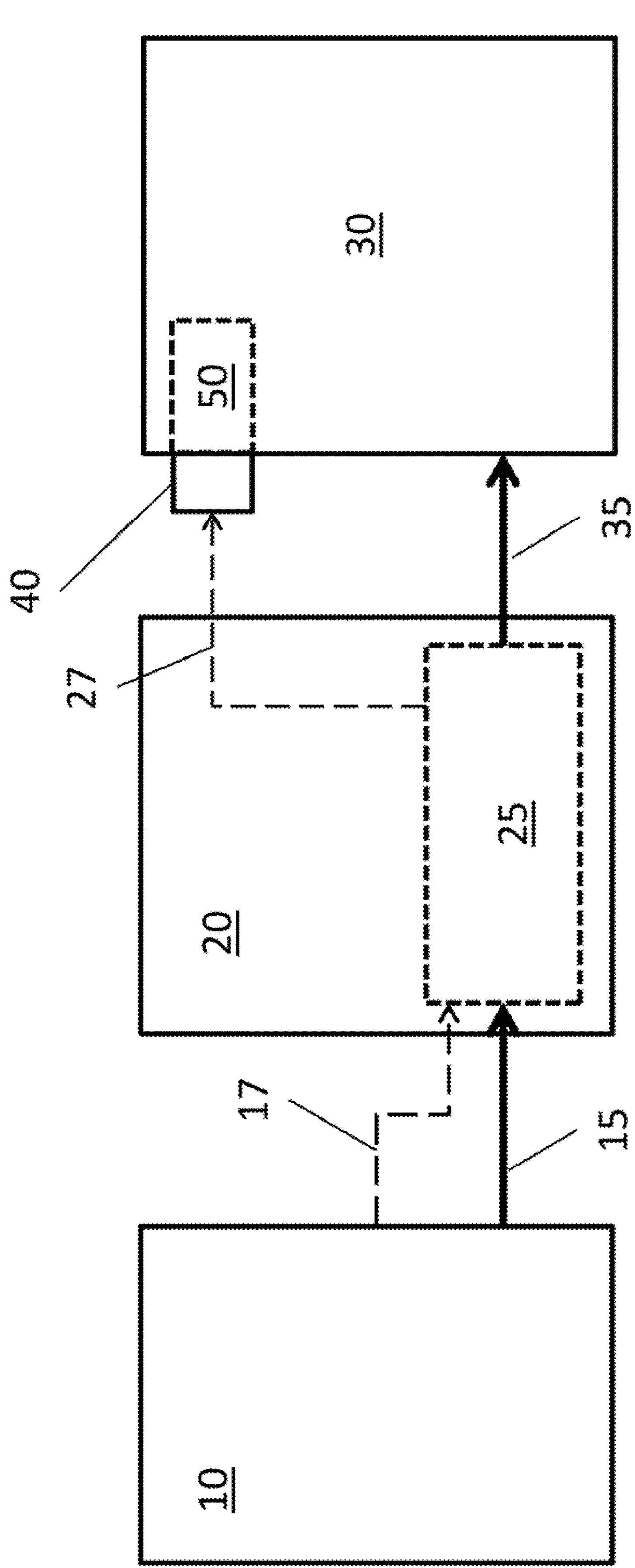
FIG. 2 illustrates a non-zeroized state for an advanced ground-air networking radio with a hold-up battery switch connected to the hold-up battery of the advanced ground-air networking radio.

FIG. 2 illustrates a non-zeroized state for an advanced ground-air networking radio 30 with a hold-up battery switch 40 connected to the hold-up battery 50 of the advanced ground-air networking radio 30. As illustrated in FIG. 2, on a military vehicle 10; such as personnel carriers, supply trucks, mobile artillery vehicles, and helicopters; provides power 15 to an advanced ground-air networking radio power adapter 20, which includes a radio output switch 25 that provides power 35 to the advanced ground-air networking radio 30.

The advanced ground-air networking radio 30 includes a hold-up battery 50, to which a hold-up battery switch 40 is connected to a terminal thereof. The hold-up battery 50 maintains the programmed information (such as the highly classified software that provides the secure communications between friendlies in a theater of operations) in the advanced ground-air networking radio 30.

It is noted power 15 may or may not be provided to advanced ground-air networking radio power adapter 20.

As further illustrated in FIG. 2, the military vehicle 10 is configured to provide a ground zeroize signal 17 therefrom. The advanced ground-air networking radio power adapter 20 is configured to receive the ground zeroize signal 17. If a ground zeroize signal 17 is received, the ground zeroize signal 27 is passed onto the hold-up battery switch 40.

The hold-up battery switch 40 includes circuitry (not shown) therein. The circuitry is configured such that when hold-up battery switch 40 is in a non-zeroized state, the circuitry provides a low impedance path between a negative terminal of hold-up battery 50 and a chassis of the advanced ground-air networking radio 30.

Moreover, the circuitry is configured such that when hold-up battery switch 40 is in a zeroized state, the circuitry provides a high impedance path between a negative terminal of hold-up battery 50 and a chassis of the advanced ground-air networking radio 30. The high impedance, in combination with a powering down of the advanced ground-air networking radio power adapter 20, zeroizes the advanced ground-air networking radio 30.

However, since FIG. 2 illustrates a non-zeroized state for an advanced ground-air networking radio 30, no ground zeroize signal 17 is received from the military vehicle 10 and the circuitry, within the hold-up battery switch 40, provides a low impedance path between a negative terminal of hold-up battery 50 and a chassis of the advanced ground-air networking radio 30.

Figure 3:
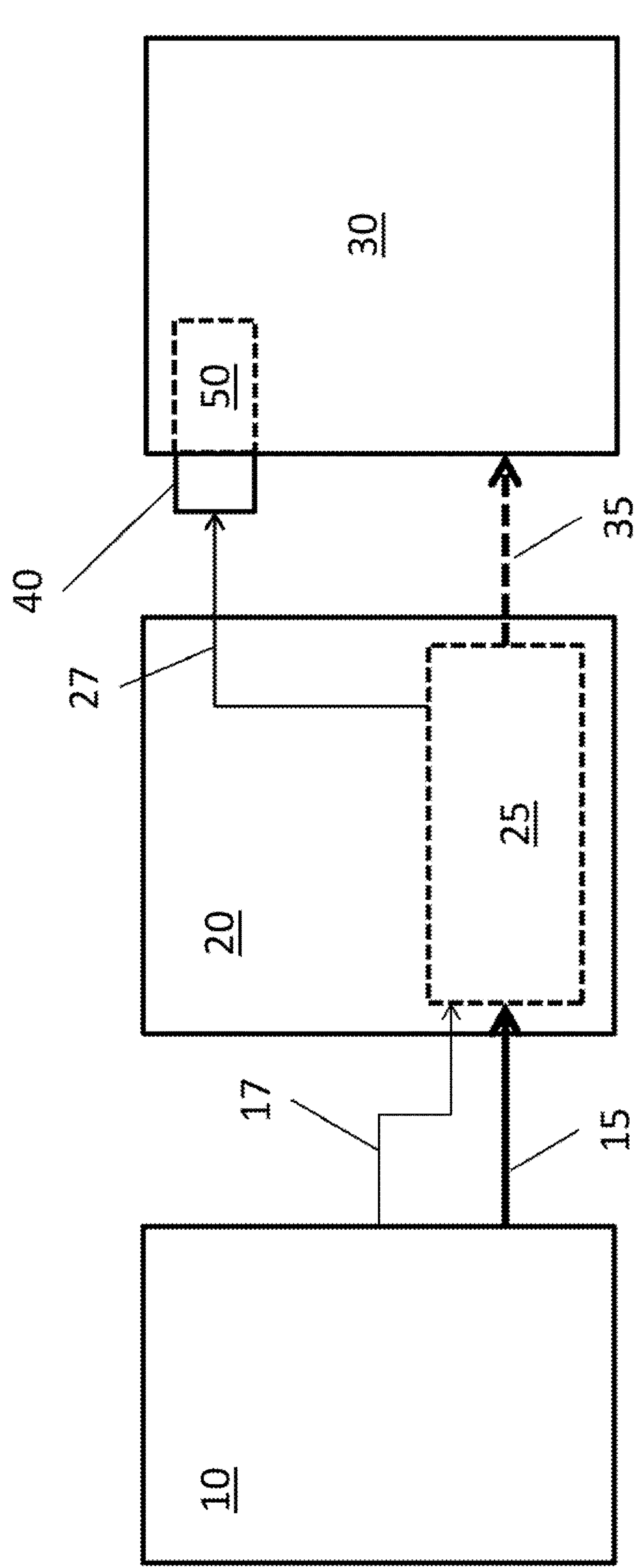
FIG. 3 illustrates a zeroized state for an advanced ground-air networking radio with a hold-up battery switch connected to the hold-up battery of the advanced ground-air networking radio.

FIG. 3 illustrates a zeroized state for an advanced ground-air networking radio with a hold-up battery switch connected to the hold-up battery of the advanced ground-air networking radio. As illustrated in FIG. 3, on a military vehicle 10; such as personnel carriers, supply trucks, mobile artillery vehicles, and helicopters; provides power 15 to an advanced ground-air networking radio power adapter 20, which includes a radio output switch 25 that provides power 35 to the advanced ground-air networking radio 30.

The advanced ground-air networking radio 30 includes a hold-up battery 50, to which a hold-up battery switch 40 is connected to a terminal thereof. The hold-up battery 50 maintains the programmed information (such as the highly classified software that provides the secure communications between friendlies in a theater of operations) in the advanced ground-air networking radio 30.

It is noted power 15 may or may not be provided to advanced ground-air networking radio power adapter 20.

As further illustrated in FIG. 3, the military vehicle 10 is configured to provide a ground zeroize signal 17 therefrom. The advanced ground-air networking radio power adapter 20 is configured to receive the ground zeroize signal 17. If a ground zeroize signal 17 is received, the ground zeroize signal 27 is passed onto the hold-up battery switch 40.

The hold-up battery switch 40 includes circuitry (not shown) therein. The circuitry is configured such that when hold-up battery switch 40 is in a non-zeroized state, the circuitry provides a low impedance path between a negative terminal of hold-up battery 50 and a chassis of the advanced ground-air networking radio 30.

Moreover, the circuitry is configured such that when hold-up battery switch 40 is in a zeroized state, the circuitry provides a high impedance path between a negative terminal of hold-up battery 50 and a chassis of the advanced ground-air networking radio 30. The high impedance, in combination with a powering down of the advanced ground-air networking radio power adapter 20, zeroizes the advanced ground-air networking radio 30.

Since FIG. 3 illustrates a zeroized state for an advanced ground-air networking radio 30, a ground zeroize signal 17 is received from the military vehicle 10 and the ground zeroize signal 27 is passed onto the hold-up battery switch 40 and the circuitry, within the hold-up battery switch 40, provides a high impedance path between a negative terminal of hold-up battery 50 and a chassis of the advanced ground-air networking radio 30.

Figure 4:
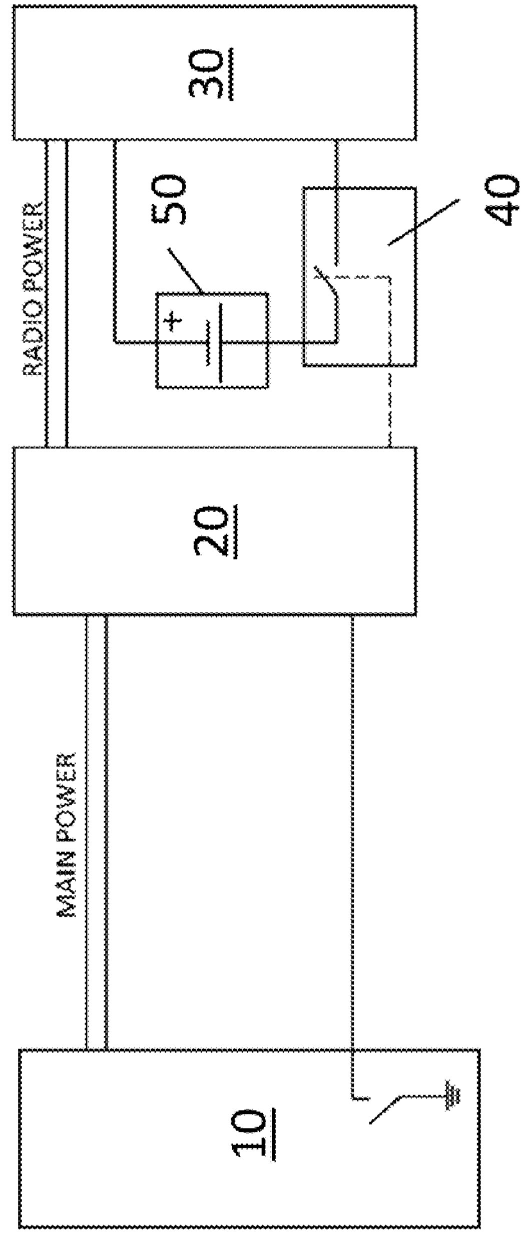
FIG. 4 illustrates a circuit diagram for an advanced ground-air networking radio with a hold-up battery switch connected to the hold-up battery of the advanced ground-air networking radio.

FIG. 4 illustrates a circuit diagram for an advanced ground-air networking radio 30 with a hold-up battery switch 40 connected to the hold-up battery 50 of the advanced ground-air networking radio 30. As illustrated in FIG. 4, on a military vehicle 10; such as personnel carriers, supply trucks, mobile artillery vehicles, and helicopters; provides power to an advanced ground-air networking radio power adapter 20 that provides radio power to the advanced ground-air networking radio 30 via the radio power switch 25.

The advanced ground-air networking radio 30 includes a hold-up battery 50, to which a hold-up battery switch 40 is connected to a terminal thereof. The hold-up battery 50 maintains the programmed information (such as the highly classified software that provides the secure communications between friendlies in a theater of operations) in the advanced ground-air networking radio 30.

As further illustrated in FIG. 4, the military vehicle 10 is configured to provide a ground zeroize signal therefrom. The advanced ground-air networking radio power adapter is configured to receive the ground zeroize signal. If a ground zeroize signal is received, the ground zeroize signal is passed onto the hold-up battery switch 40.

The hold-up battery switch 40 includes circuitry (not shown) therein. The circuitry is configured such that when hold-up battery switch 40 is in a non-zeroized state, the circuitry provides a low impedance path between a negative terminal of hold-up battery 50 and a chassis of the advanced ground-air networking radio 30.

Moreover, the circuitry is configured such that when hold-up battery switch 40 is in a zeroized state, the circuitry provides a high impedance path between a negative terminal of hold-up battery 50 and a chassis of the advanced ground-air networking radio 30. The high impedance, in combination with a powering down of the advanced ground-air networking radio power adapter 20, zeroizes the advanced ground-air networking radio 30.

Figure 5:
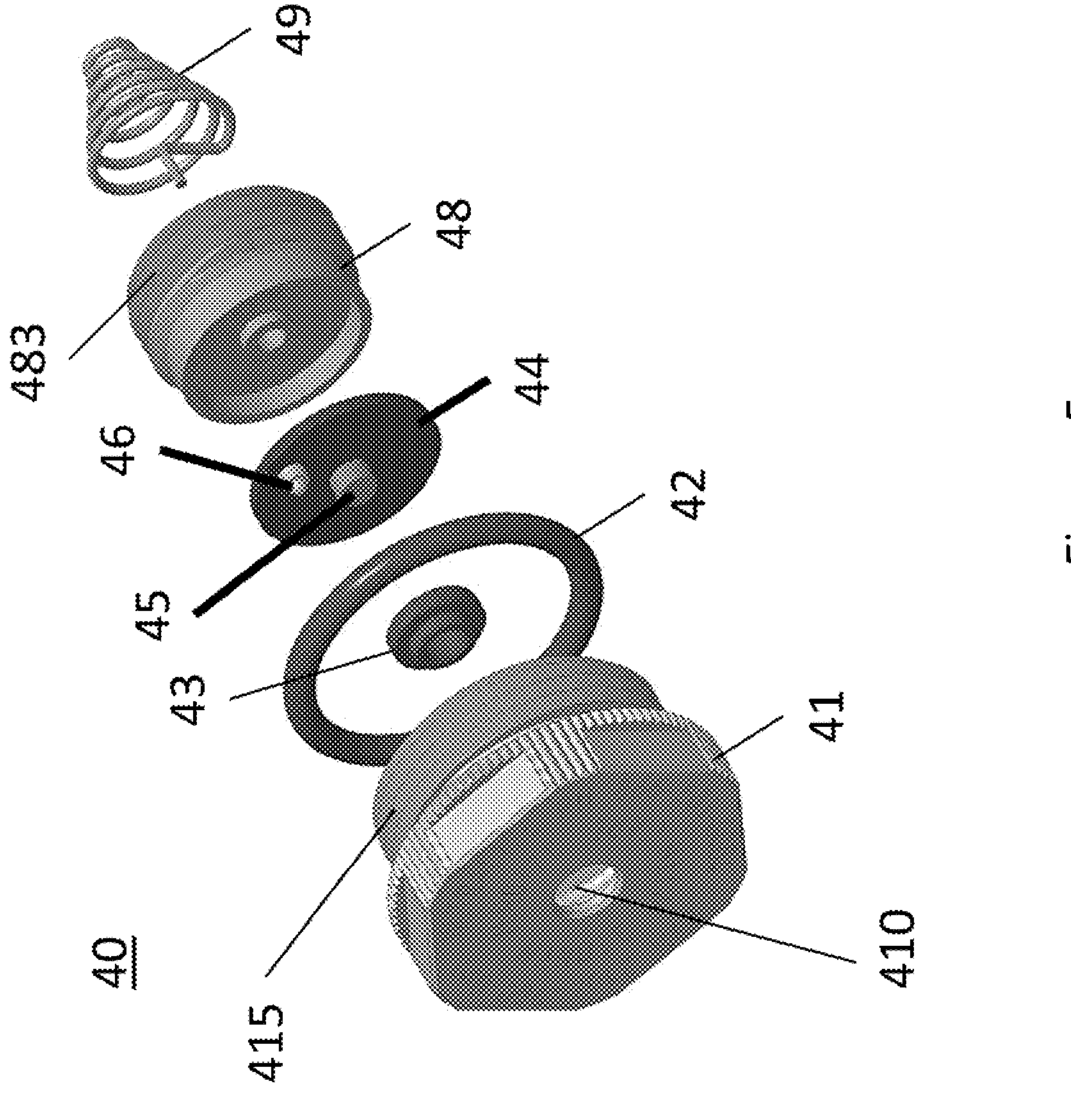
FIG. 5 illustrates an exploded view of a hold-up battery switch.

FIG. 5 illustrates an exploded view of a hold-up battery switch 40. As illustrated in FIG. 5, hold-up battery switch 40 includes an exterior cap 41 having an opening 410 therein. The hold-up battery switch 40 further includes an O-ring 42 to provide a hermetic seal for the hold-up battery switch 40.

FIG. 5 shows that hold-up battery switch 40 includes an electrical insulation ring 43 for providing electrical insulation between the exterior cap 41 and a zeroize contact 45 on a zeroize circuit board 44. The zeroize contact 45 is encircled by the insulation ring 43 when it is located within the opening 410 of the exterior cap 41. The insulation ring 43 prevents the zeroizing function from being triggered accidently by a grounding to the exterior cap 41.

The zeroize circuit board 44 includes electrical contact 46 for providing an electrical connection between the exterior cap 41 and circuitry (not shown) on the zeroize circuit board 44. The zeroize circuit board 44 may be disc shaped.

The exterior cap 41 includes an exterior cap exterior interface 415. The exterior cap exterior interface 415 is configured to engage a chassis of an advanced ground-air networking radio (not shown). Moreover, the exterior cap 41 includes an exterior cap interior interface (not shown).

In a preferred embodiment, the exterior cap exterior interface 415 is a threaded interface.

In a preferred embodiment, the exterior cap interior interface is a threaded interface.

The hold-up battery switch 40 further includes an interior cap (clamp) 48 and a spring 49. The spring 49 is configured to engage a negative terminal of a hold-up battery (not shown). The interior cap 48 includes an interior cap exterior interface 483. The interior cap exterior interface 483 is configured to operationally engage (connect to) the exterior cap interior interface of the exterior cap 41.

Moreover, the interior cap 48 is an insulator that prevents an electrical connection between the exterior cap 41 and the spring 49 as well as being configured to secure the circuit board 44 against the exterior cap 41.

In a preferred embodiment, the interior cap exterior interface 483 is a threaded interface.

Figure 6:
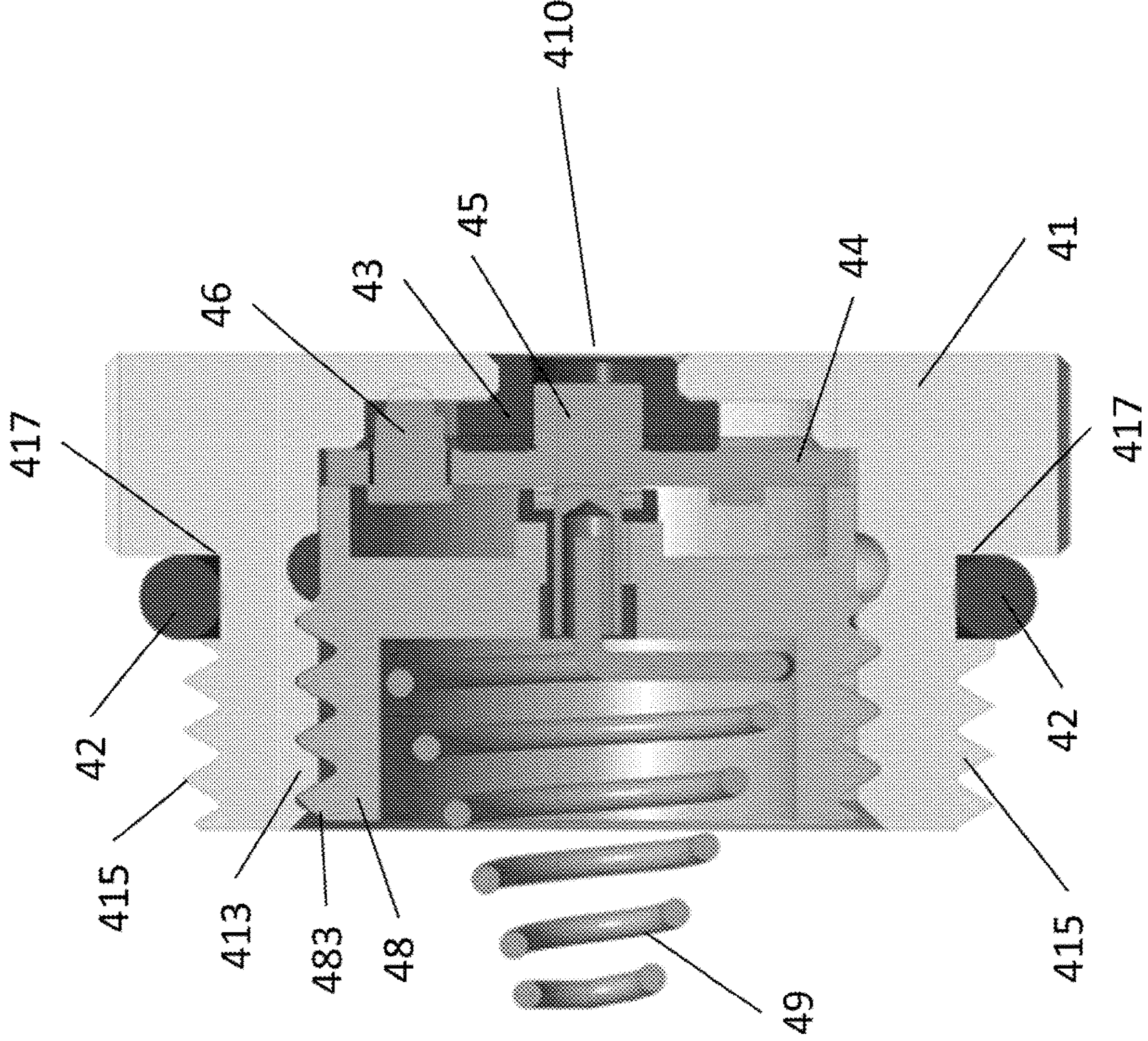
FIG. 6 illustrates an assembled view of the hold-up battery switch of FIG. 5.

FIG. 6 illustrates an assembled view of the hold-up battery switch 40. As illustrated in FIG. 6, hold-up battery switch 40 includes an exterior cap 41 having an opening 410 therein. The hold-up battery switch 40 further includes an O-ring 42 to provide a hermetic seal for the hold-up battery switch 40.

FIG. 6 shows that the hold-up battery switch 40 includes an electrical insulation ring 43 for providing electrical insulation between the exterior cap 41 and a zeroize contact 45 on a zeroize circuit board 44. When the hold-up battery switch 40 is assembled, the electrical insulation ring 43 is located within the opening 410. The zeroize contact 45 is encircled by the insulation ring 43 when it is located within the opening 410 of the exterior cap 41 so that there is not electrical connection between the zeroize contact 45 and the exterior cap 41. The insulation ring 43 prevents the zeroizing function from being triggered accidently by a grounding to the exterior cap 41. The zeroize circuit board 44 may be disc shaped.

The zeroize circuit board 44 includes electrical contact 46 for providing an electrical connection between the exterior cap 41 and circuitry (not shown) on the zeroize circuit board 44.

The exterior cap 41 includes an exterior cap exterior interface 415. The exterior cap exterior interface 415 is configured to engage a chassis of an advanced ground-air networking radio (not shown). Moreover, the exterior cap 41 includes an exterior cap interior interface 413.

In a preferred embodiment, the exterior cap exterior interface 415 is a threaded interface.

In a preferred embodiment, the exterior cap interior interface 413 is a threaded interface.

The exterior cap 41 includes an O-ring groove 417 configured to secure the O-ring 42 in place.

The hold-up battery switch 40 further includes an interior cap (clamp) 48 and a spring 49. The spring 49 is configured to engage a negative terminal of a hold-up battery (not shown). The interior cap 48 includes an interior cap exterior interface 483. The interior cap exterior interface 483 is configured to operationally engage (connect to) the exterior cap interior interface 413 of the exterior cap 41.

Moreover, the interior cap 48 is an insulator that prevents an electrical connection between the exterior cap 41 and the spring 49 as well as being configured to secure the circuit board 44 against the exterior cap 41.

When the hold-up battery switch 40 is assembled, the interior cap 48 is operationally connected to the exterior cap 41, and the zeroize circuit board disc 44 is located between the exterior cap 41 and an interior cap 48. The interior cap 48 clamps the zeroize circuit board disc 44 against (within) the exterior cap 41 such that the zeroize contact 45 is exposed in the opening 410 of the exterior cap 41.

As noted above, hold-up battery switch provides a device to remotely disconnect the negative battery of the hold-up battery from an advanced ground-air networking radio to enable zeroization thereof.

The hold-up battery switch provides a device to enable remote zeroization of an advanced ground-air networking radio without having to remove the hold-up battery from the advanced ground-air networking radio.

The hold-up battery switch provides a device to enable remote zeroization of an advanced ground-air networking radio without the need to have local access to the advanced ground-air networking radio.

Moreover, the hold-up battery switch is configured such that when hold-up battery switch is in a zeroized state, the hold-up battery switch provides a high impedance path between a negative terminal of hold-up battery and a chassis of the advanced ground-air networking radio. The high impedance, in combination with a powering down of the advanced ground-air networking radio power adapter, zeroizes the advanced ground-air networking radio.

A hold-up battery switch comprises an exterior cap having an opening and a zeroize circuit board; the zeroize circuit board including a zeroize contact; the zeroize contact being located within the opening of the exterior cap; the exterior cap having an exterior cap exterior interface, the exterior cap exterior interface being configured to engage a chassis of an advanced ground-air networking radio.

The hold-up battery switch may further comprise an O-ring configured to provide a hermetic seal for the hold-up battery switch.

The hold-up battery switch may further comprise an electrical insulation ring configured to provide electrical insulation between the exterior cap and the zeroize contact.

The zeroize contact may be encircled by the insulation ring when the zeroize contact is located within the opening of the exterior cap.

The zeroize circuit board may include an electrical contact configured to provide an electrical connection between the exterior cap and the zeroize circuit board.

The insulation ring may be configured to prevent a zeroizing function from being triggered by a grounding to the exterior cap.

The hold-up battery switch may further comprise an interior cap and a spring.

The exterior cap may include an exterior cap interior interface. The interior cap may include an interior cap exterior interface. The exterior cap interior interface may be configured to engage the interior cap exterior interface.

The exterior cap interior interface and the interior cap exterior interface may be threaded interfaces.

The exterior cap exterior interface may be a threaded interface.

An advanced ground-air networking radio system, comprises a power adapter; an advanced ground-air networking radio; a hold-up battery having a negative terminal; and a hold-up battery switch, operatively connected between the power adapter and the negative terminal of the hold-up battery; the hold-up battery switch including an exterior cap having an opening and a zeroize circuit board; the zeroize circuit board including a zeroize contact; the zeroize contact being located within the opening of the exterior cap; the exterior cap having an exterior cap exterior interface, the exterior cap exterior interface being configured to engage a chassis of the advanced ground-air networking radio; the hold-up battery switch being configured such that when the hold-up battery switch is in a non-zeroized state, the hold-up battery switch provides a low impedance path between the negative terminal of hold-up battery and a chassis of the advanced ground-air networking radio; the hold-up battery switch being configured such that when the hold-up battery switch is in a zeroized state, the hold-up battery switch provides a high impedance path between the negative terminal of hold-up battery and the chassis of the advanced ground-air networking radio.

The hold-up battery switch may further comprise an O-ring configured to provide a hermetic seal for the hold-up battery switch.

The hold-up battery switch may further comprise an electrical insulation ring configured to provide electrical insulation between the exterior cap and the zeroize contact.

The zeroize contact may be encircled by the insulation ring when the zeroize contact is located within the opening of the exterior cap.

The zeroize circuit board may include an electrical contact configured to provide an electrical connection between the exterior cap and the zeroize circuit board.

The insulation ring may be configured to prevent a zeroizing function from being triggered by a grounding to the exterior cap.

The hold-up battery switch may further comprise an interior cap and a spring.

The exterior cap may include an exterior cap interior interface. The interior cap may include an interior cap exterior interface. The exterior cap interior interface may be configured to engage the interior cap exterior interface.

The exterior cap interior interface and the interior cap exterior interface may be threaded interfaces.

The exterior cap exterior interface may be a threaded interface.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A hold-up battery switch comprising:

an exterior cap having a planar surface and a cylindrical surface, said planar surface connected to said cylindrical surface, said cylindrical surface and said planar surface forming a volume, said planar surface closing a first end of said volume, said planar surface including a first opening therein, said volume having a second opening at a second end of said volume, said second end being located opposite said planar surface, said first opening in said planar surface being smaller than said second opening; and a zeroize circuit board located within said volume of said cylindrical surface;

said zeroize circuit board including a zeroize contact;

said zeroize contact being located within said first opening of said first planar surface of said exterior cap;

said cylindrical surface of said exterior cap having an exterior cap exterior interface, said exterior cap exterior interface being configured to engage a chassis of an advanced ground-air networking radio.

2. The hold-up battery switch, as claimed in claim 1, further comprising:

an O-ring configured to provide a hermetic seal for the hold-up battery switch.

3. The hold-up battery switch, as claimed in claim 1, wherein said exterior cap exterior interface is a threaded interface.

4. The hold-up battery switch, as claimed in claim 1, further comprising:

an electrical insulation ring configured to provide electrical insulation between said exterior cap and said zeroize contact.

5. The hold-up battery switch, as claimed in claim 4, wherein said zeroize contact is encircled by said insulation ring when said zeroize contact is located within said opening of said exterior cap.

6. The hold-up battery switch, as claimed in claim 4, wherein said zeroize circuit board includes an electrical contact configured to provide an electrical connection between said exterior cap and said zeroize circuit board.

7. The hold-up battery switch, as claimed in claim 1, further comprising:

an interior cap; and a spring;

said interior cap being an insulator that prevents an electrical connection between said exterior cap and said spring.

8. The hold-up battery switch, as claimed in claim 7, wherein said exterior cap includes an exterior cap interior interface;

said interior cap including an interior cap exterior interface;

said exterior cap interior interface being configured to engage said interior cap exterior interface.

9. The hold-up battery switch, as claimed in claim 8, wherein said exterior cap interior interface and said interior cap exterior interface are threaded interfaces.

10. A hold-up battery switch comprising:

an exterior cap having an opening;

a zeroize circuit board; and an electrical insulation ring configured to provide electrical insulation between said exterior cap and said zeroize contact;

said zeroize circuit board including a zeroize contact;

said zeroize contact being located within said opening of said exterior cap;

said exterior cap having an exterior cap exterior interface, said exterior cap exterior interface being configured to engage a chassis of an advanced ground-air networking radio;

said insulation ring is configured to prevent a zeroizing of the advanced ground-air networking radio from being triggered by a grounding to said exterior cap.

11. An advanced ground-air networking radio system, comprising:

a power adapter;

an advanced ground-air networking radio;

a hold-up battery having a negative terminal; and a hold-up battery switch, operatively connected between said power adapter and said negative terminal of said hold-up battery;

said hold-up battery switch including an exterior cap having an opening and a zeroize circuit board;

said zeroize circuit board including a zeroize contact;

said zeroize contact being located within said opening of said exterior cap;

said exterior cap having an exterior cap exterior interface, said exterior cap exterior interface being configured to engage a chassis of the advanced ground-air networking radio;

said hold-up battery switch being configured such that when said hold-up battery switch is in a non-zeroized state, said hold-up battery switch provides a low first impedance path between said negative terminal of said hold-up battery and a chassis of said advanced ground-air networking radio;

said hold-up battery switch being configured such that when said hold-up battery switch is in a zeroized state, said hold-up battery switch provides a high second impedance path between said negative terminal of said hold-up battery and the chassis of said advanced ground-air networking radio;

said first impedance path having a lower impedance than said second impedance path.

12. The advanced ground-air networking radio system, as claimed in claim 11, wherein said hold-up battery switch includes an O-ring configured to provide a hermetic seal for said hold-up battery switch.

13. The advanced ground-air networking radio system, as claimed in claim 11, wherein said exterior cap exterior interface is a threaded interface.

14. The advanced ground-air networking radio system, as claimed in claim 11, wherein said hold-up battery switch includes an interior cap and a spring.

15. The advanced ground-air networking radio system, as claimed in claim 14, wherein said exterior cap includes an exterior cap interior interface;

said interior cap including an interior cap exterior interface;

said exterior cap interior interface being configured to engage said interior cap exterior interface.

16. The advanced ground-air networking radio system, as claimed in claim 15, wherein said exterior cap interior interface and said interior cap exterior interface are threaded interfaces.

17. The advanced ground-air networking radio system, as claimed in claim 11, wherein said hold-up battery switch includes an electrical insulation ring configured to provide electrical insulation between said exterior cap and said zeroize contact.

18. The advanced ground-air networking radio system, as claimed in claim 17, wherein said zeroize contact is encircled by said insulation ring when said zeroize contact is located within said opening of said exterior cap.

19. The advanced ground-air networking radio system, as claimed in claim 17, wherein said zeroize circuit board includes an electrical contact configured to provide an electrical connection between said exterior cap and said zeroize circuit board.

20. The advanced ground-air networking radio system, as claimed in claim 17, wherein said insulation ring is configured to prevent a zeroizing of the advanced ground-air networking radio from being triggered by a grounding to said exterior cap.

* * * * *